(12) United States Patent
Samuel

(10) Patent No.: US 7,597,388 B1
(45) Date of Patent: Oct. 6, 2009

(54) ELECTRIC CHARGING ROOF ON AN AUTOMOBILE

(75) Inventor: Woodson Wayne Samuel, Long Beach, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/167,192

(22) Filed: Jul. 2, 2008

(51) Int. Cl.
B60R 13/07 (2006.01)

(52) U.S. Cl. ...................................... 296/210

(58) Field of Classification Search ................. 296/210, 296/97.7; 427/74; 52/173.3; 257/E27.125, 257/E31.041; 136/252, 206, 256; 244/172.7
See application file for complete search history.

(56) References Cited

U.S. PATENT DOCUMENTS

| | | | |
|---|---|---|---|
| 4,090,577 A | | 5/1978 | Moore |
| 4,141,425 A | | 2/1979 | Treat |
| 4,181,188 A | | 1/1980 | Dessert |
| 4,592,436 A | * | 6/1986 | Tomei ........................ 136/245 |
| 4,605,813 A | | 8/1986 | Takeuchi et al. |
| 5,008,062 A | * | 4/1991 | Anderson et al. ...... 264/272.15 |
| 5,213,626 A | | 5/1993 | Paetz |
| 5,228,925 A | * | 7/1993 | Nath et al. .................. 296/215 |
| 5,545,261 A | | 8/1996 | Ganz et al. |
| 5,800,631 A | * | 9/1998 | Yamada et al. .............. 136/251 |
| 6,369,316 B1 | * | 4/2002 | Plessing et al. ............. 136/251 |
| 6,423,894 B1 | * | 7/2002 | Patz et al. ................... 296/210 |
| 6,536,828 B2 | * | 3/2003 | Love et al. ................. 296/97.2 |
| 6,538,192 B1 | | 3/2003 | Coster et al. |
| 6,586,668 B2 | * | 7/2003 | Shugar et al. ............... 136/251 |
| 6,991,051 B2 | | 1/2006 | Swindell et al. |
| 7,306,823 B2 | | 12/2007 | Sager et al. |
| 7,309,831 B2 | * | 12/2007 | Yamada et al. .............. 136/256 |
| 7,374,984 B2 | | 5/2008 | Hoffman et al. |
| 2002/0053816 A1 | | 5/2002 | Teschner et al. |
| 2002/0101097 A1 | | 8/2002 | Muller |
| 2005/0012021 A1 | * | 1/2005 | Middelman et al. ......... 250/200 |
| 2005/0133082 A1 | * | 6/2005 | Konold et al. ............... 136/246 |
| 2006/0037641 A1 | | 2/2006 | Kibbel et al. |
| 2006/0207644 A1 | * | 9/2006 | Robinson et al. ............ 136/243 |
| 2007/0125417 A1 | | 6/2007 | Johanson et al. |
| 2007/0158978 A1 | | 7/2007 | Woodhouse et al. |
| 2007/0261896 A1 | | 11/2007 | Shaffer et al. |
| 2008/0236653 A1 | * | 10/2008 | Kelly ......................... 136/251 |

FOREIGN PATENT DOCUMENTS

| | | |
|---|---|---|
| DE | 10256845 | 7/2004 |
| DE | 10313000 | 9/2004 |
| FR | 2768972 | 4/1999 |
| JP | 58056943 | 4/1983 |
| JP | 59184574 | 10/1984 |
| JP | 3204979 | 9/1991 |
| JP | 2007026883 | 2/2007 |
| JP | 2007053049 | 3/2007 |
| WO | WO 2007/090966 | 8/2007 |

* cited by examiner

Primary Examiner—Kiran B. Patel
(74) Attorney, Agent, or Firm—Snell & Wilmer L.L.P.

(57) ABSTRACT

The present invention relates to an electric charging roof on an automobile. The present invention can be or a method of manufacture of an automobile having a body with an interior, a roof attached to the body, a layer of paint coated on top of the roof, an energy storage unit located within the interior of the body, and a layer of photovoltaic material deposited on top of the layer of paint to form a solar panel connected to the energy storage unit.

6 Claims, 5 Drawing Sheets

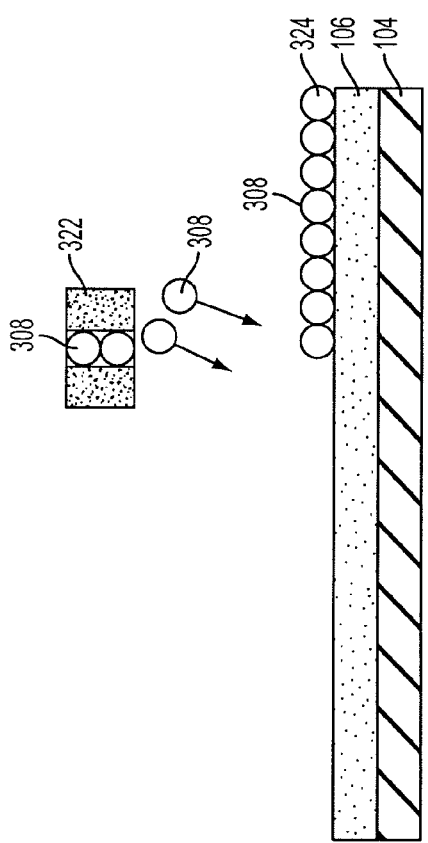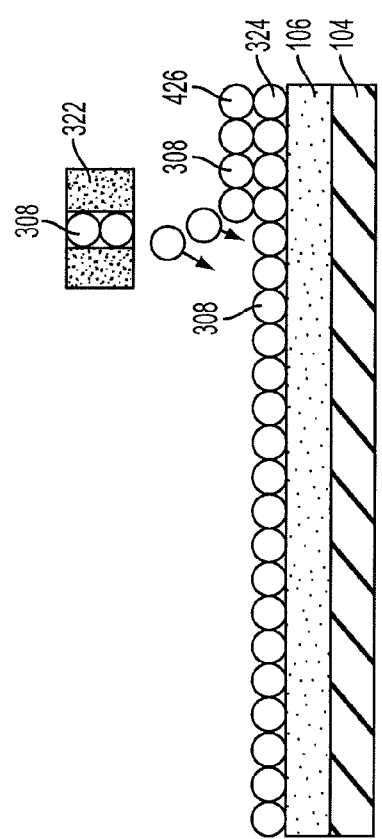

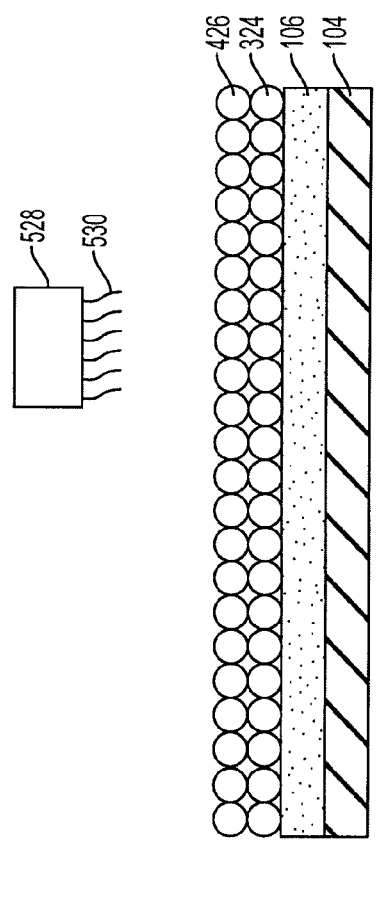
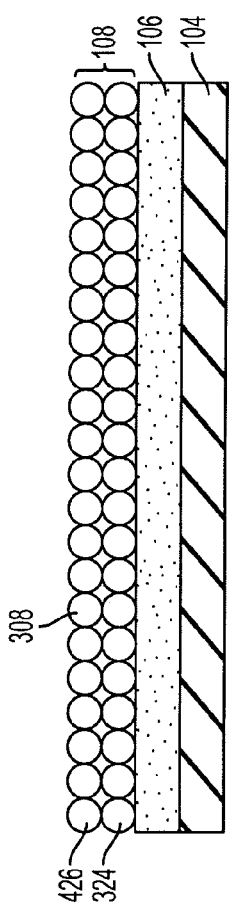

ELECTRIC CHARGING ROOF ON AN AUTOMOBILE

BACKGROUND

1. Field

The present invention relates to an electric charging roof on an automobile.

2. Background

Conventional solar panels in automobiles often have several drawbacks. For example, interior solar panels may not efficiently utilize the energy of the sun due to poor location placement. Also, conventional solar panels tend to be rigid and are not easily adapted to various shapes of the automobile. In addition, conventional solar panels can be prone to shattering which create hazards for the passenger, bystanders, and/or rescue crews in an accident. Furthermore, when conventional solar panels are damaged, the entire solar panel often has to be discarded because the remaining undamaged portions do not provide enough energy and/or are still hazardous due to sharp edges. Even if the entire solar panel does not have to be discarded, any such attempts to repair the solar panel can be prohibitively expensive since entire portions of the solar panel may have to be replaced and reconnected.

Thus, there is a need for a solar panel on automobiles which is located to improve energy output, is easily adapted to various roof shapes, is resistant to shattering in an accident, and is easy to repair.

SUMMARY

In one embodiment, the present invention is an automobile having a body with an interior, a roof attached to the body, a layer of paint coated on top of the roof, an energy storage unit located within the interior of the body, and a layer of photovoltaic material deposited on top of the layer of paint to form a solar panel connected to the energy storage unit.

In another embodiment, the present invention is a method for manufacturing a roof of an automobile including the steps of depositing a layer of paint on the roof, depositing a first layer of photovoltaic material to form a solar panel on top of the paint, and forming an electrical lead on the solar panel.

In yet another embodiment, the present invention is a method for manufacturing an automobile including the steps of depositing a layer of paint on a roof of the automobile before the roof is attached to the automobile, depositing a first layer of photovoltaic material to form a solar panel on top of the paint, forming an electrical lead on the solar panel such that the electrical lead traverses an antenna connection connecting an antenna on the roof to an interior of a body of the automobile, curing the first layer of photovoltaic material, and connecting the solar panel to an energy storage unit in the car through electrical leads that enter an interior of the automobile through the antenna connection.

BRIEF DESCRIPTION OF THE DRAWINGS

The features, objects, and advantages of the present invention will become more apparent from the detailed description set forth below when taken in conjunction with the drawings, wherein:

FIG. 3 is a side view of particles of photovoltaic material being deposited on a roof of an embodiment of the present invention;

FIG. 4 is a side view of particles of photovoltaic material being deposited on a roof of an embodiment of the present invention;

FIG. 5 is a side view of layers of photovoltaic material being cured of an embodiment of the present invention;

FIG. 6 is a side view of layers of photovoltaic material after the layers of photovoltaic material has been cured of an embodiment of the present invention.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
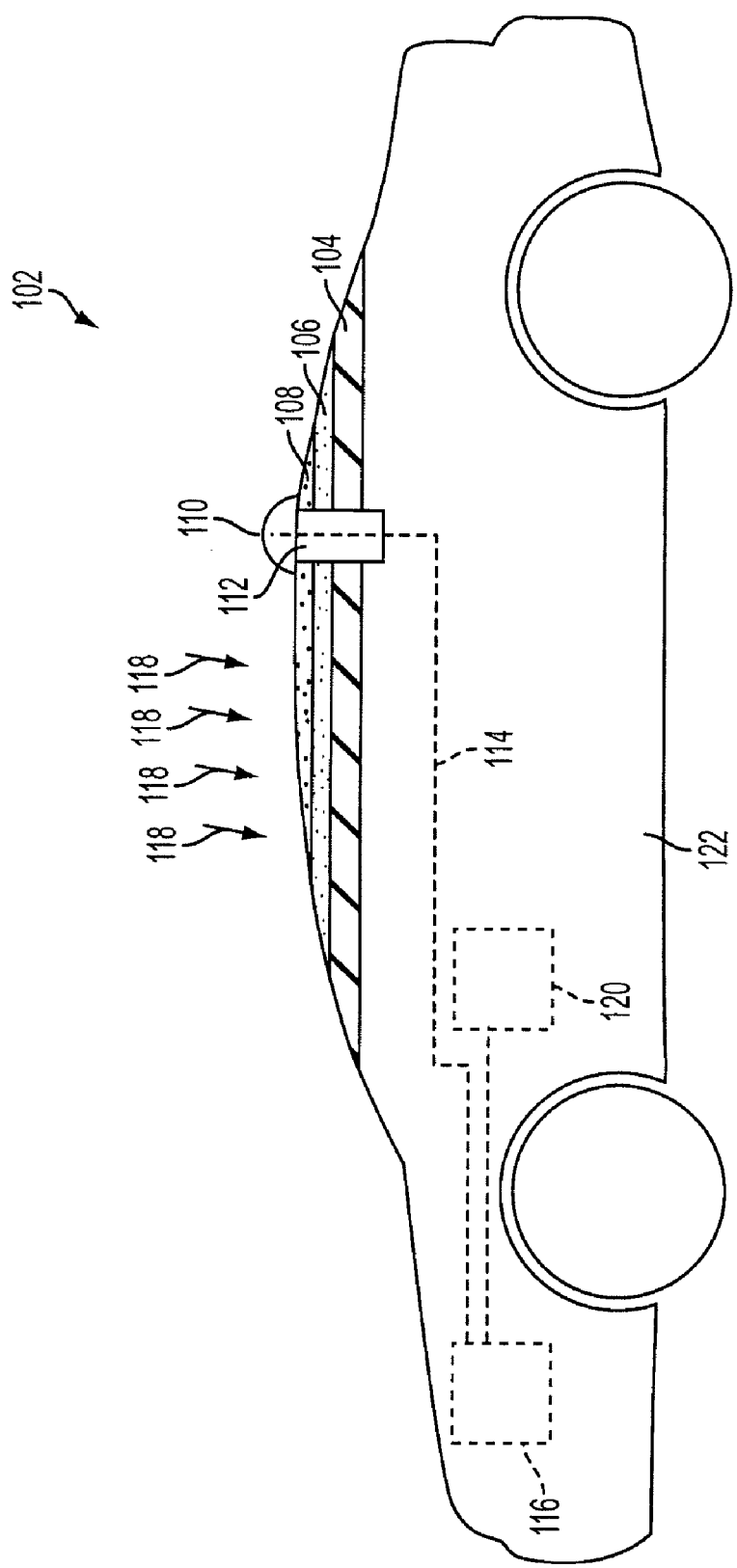
FIG. 1 is a side view of an embodiment of the present invention.

FIG. 1 is a side view of the present invention and is not drawn to scale to better illustrate features of the present invention. As seen in FIG. 1, an automobile 102 includes a body 122, a roof 104, a layer of paint 106, a solar panel 108, an antenna 110, an energy storage unit 116, and accessories 120. Body 122 is connected to roof 104 and has an interior where energy storage unit 116 and/or accessories 120 are located. The layer of paint 106 coats a top of roof 104 and solar panel 108 lies on top of layer of paint 106.

Furthermore, an antenna 110 is located on roof 104 and is connected to the interior of body 122 through an antenna connection 112. Electrical lead 114 connects solar panel 108 to energy storage unit 116 through antenna connection 112. Since antenna 110 needs to be connected to the interior of body 122, having electrical lead 114 connect solar panel 108 to energy storage unit 116 through antenna connection 112 might minimize the number of entrances and gaps to the interior of body 122 and furthermore provides an efficient access point to the interior of body 122 for electrical lead 114. That is, electrical lead 114 will not have to travel for an extended length being exposed to the air or exterior environment of automobile 102. In one embodiment, antenna 110 can also utilize electrical lead 114 to carry and/or transmit electricity and/or signals.

Although in FIG. 1 electrical lead 114 connects solar panel 108 to energy storage unit 116 through antenna connection 112, it is contemplated that electrical lead 114 can connect solar panel 108 to energy storage unit 116 through a variety of other locations on an automobile such as through a trunk, a window, a wheel well, an engine bay, etc. Furthermore, although antenna 110 is located on roof 104, it is contemplated that antenna 110 can be located anywhere on body 122 of automobile 102.

Automobile 102 can be, for example, a combustion engine car, a hybrid car, an electric car, a natural gas car, a hydrogen fuel car, or any other type of vehicle suitable for transportation.

Solar panel 108 is advantageously located on top of roof 104 of automobile 102 because it is contemplated that such a location can optimize or improve the amount of light 118 that solar panel 108 receives. Furthermore, in the event of an accident, it is contemplated that locating solar panel 108 on top of roof 104 can minimize the likelihood of solar panel 108 receiving a strong impact. This can reduce the likelihood that solar panel 108 would be damaged. Advantageously, this can reduce the amount of hazards faced by passengers within automobile 102 and also any bystanders and/or rescue workers since there will be a reduced amount of harmful or sharp debris that has detached from solar panel 108 in an area surrounding automobile 102. However, solar panel 108 can be located on other locations of automobile 102 such as on windows, an engine hood, a trunk hood, a door panel, etc.

Solar panel 108 can be various types of solar panels such amorphous, and/or vaporware solar panels that can be formed by deposition of photovoltaic material onto a roof of an automobile. Amorphous solar panels can comprise photovoltaic material forming thin layers of silicon such as micro-thin layers of silicon formed over large substrates to form solar panel 108. Vaporware solar panels can comprise photovoltaic materials which can be sprayed onto a substrate to form solar panel 108. In both amorphous and vaporware solar panels, it is contemplated that photovoltaic material can be nano-particles.

Advantageously amorphous and/or vaporware solar panels can be flexible and/or aerodynamic. This can reduce the drag created by solar panels 108 on roof 104 of automobile 102 and improve efficiencies of automobile 102. Furthermore, if automobile 102 is in an accident, it is contemplated that the solar panel 108 can be more resistant to shattering when compared to a conventional solar panel on the roof of an automobile.

Furthermore, if solar panel 108 is damaged in an accident, it is contemplated that sharp portions of solar panel 108 due to the damage can be reduced. For example, if solar panel 108 is damaged, then instead of producing sharp shards, it is contemplated that solar panel 108 can crumble into dust and/or have dislodged portions with a reduced amount of sharpness. Again, the construction of solar panel 108 in the present invention can reduce the amount of hazards faced by passengers within automobile 102, any bystanders, and/or rescue workers since there will be a reduced amount of harmful or sharp debris that has detached or is protruding from solar panel 108 in an area surrounding automobile 102.

Solar panel 108 can be monocrystalline and/or polycrystalline solar panels provided they can be deposited, sprayed, and/or painted onto a roof of an automobile and can be flexible and/or aerodynamic. Monocrystalline solar panels can be made from a single large crystal. Polycrystalline solar panels can be made from blocks of silicon which contain many small crystals.

Figure 7:
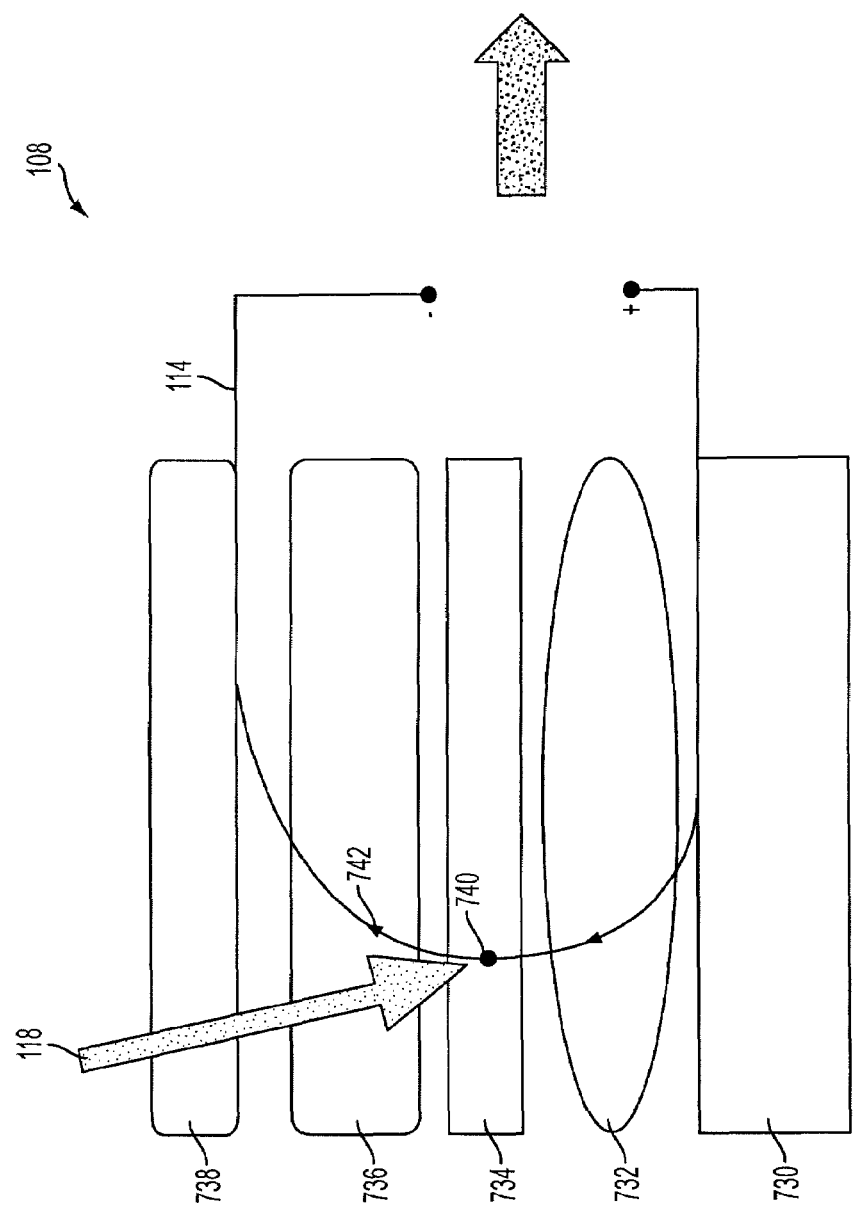
FIG. 7 is a schematic diagram of a solar panel of an embodiment of the present invention.

In one embodiment, solar panel 108 is a dye sensitized solar panel. As shown in FIG. 7, which is a schematic diagram of solar panel 108 as a dye sensitized solar panel, solar panel 108 can comprise multiple layers of photovoltaic material such as a conducting substrate 730, an electrolyte layer 732, a dye layer 734, a nano-porous titania (titanium dioxide) layer 736, and a transparent conductor 738. Light 118 strikes dye layer 734 at 740 which aids in producing an electrical current 742. Electrical current 742 can then be transported through electrical lead 114. It is contemplated that conducting substrate 730 can be the layer of paint 106 or a different layer completely.

In another embodiment, solar panel 108 is a thin film solar panel comprising multiple layers of photovoltaic material such as, a 5.0 µm to 10.0 µm layer of Katpon, a 0.5 µm to 1.5 µm layer of Mo, a 1.0 µm to 2.0 µm layer of Cu (In, Ga) (S, Se)$_2$, a 5 µm layer of CdS, and/or a 0.5 µm to 1.5 µm layer of ZnO. Solar panel 108 can also have an electrode comprising Ni/Al connected to one of the layers of photovoltaic material such as the layer of ZnO.

In yet another embodiment, solar panel 108 comprises photovoltaic materials such as coated semiconducting nano-particles and/or quantum dots that can be sprayed on top of the layer of paint 106, fullerene single wall nanotube complexes, and/or silicone materials in conjunctions with the photovoltaic materials described above.

Light 118 that strikes solar panel 108 can be, for example, light from the sun, light from a light bulb, fluorescent light, etc. Light 118 can be, in addition to visible light, any other type of electromagnetic waves such as infrared light or ultraviolet light. Advantageously solar panel 108 can capture more energy than a conventional solar panel during daylight. Furthermore, solar panel 108 can capture energy during cloudy days when there is a reduced amount of visible light and/or during night time when there is a severe reduction in visible light.

Accessories 120 can be, for example, electronics such as air conditioning units, heaters, radios, GPS systems, audio playback devices, DVD players, navigation equipment, etc. Accessories 120 can also be an engine such as in a hybrid automobile or hydrogen automobile. Accessories 120 can also be a spark plug used during the ignition of a combustion engine.

Energy storage unit 116 can be utilized to store electricity transmitted from solar panel 108. Energy storage unit 116 can be, for example, a battery large enough to store a suitable amount of energy for operation of automobile 102. Energy storage unit 116 can also provide energy to accessories 120. Energy storage unit 116 can also convert electricity from solar panel 108 into a suitable energy for use with accessories 120 such as electricity with the proper wattage and/or voltage. Thus, for example, if automobile 102 is a hybrid automobile, this can extend a maximum travel distance of automobile 102 and also improve the efficiency of automobile 102 while reducing gas consumption. Furthermore, if automobile 102 requires an ignition to start, the present invention can reduce the likelihood of energy storage unit 116 running out of energy and being unable to start automobile 102 since energy storage unit 116 is being replenished by solar panel 108.

In operation, light 118 strikes solar panel 108. Solar panel 108 then converts the energy from light 118 into usable electricity. The useable electricity is then transmitted to energy storage unit 116 through electrical lead 114 traversing antenna connection 112. Energy storage unit 116 then provides energy to accessories 120.

Figure 2:
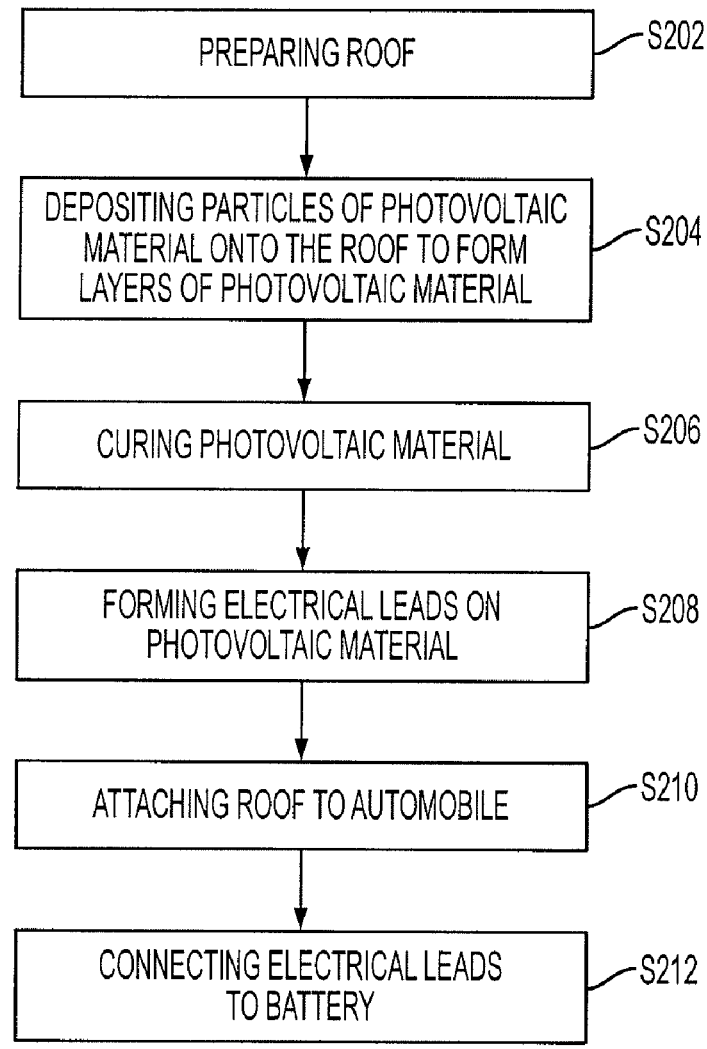
FIG. 2 is a flowchart of a method of producing an embodiment of the present invention.

FIG. 2 is a flowchart of a method of producing a preferred embodiment of the present invention. In step S202, roof 104 is prepared for deposition of solar panel 108. The preparation can include, for example, washing roof 104, electro deposition coating of anti-rust material on roof 104, sanding roof 104, and/or painting roof 104. The preparation can also include covering and shielding portions of roof 104 with removable material to prevent unwanted deposition of photovoltaic material.

In step S204, particles of photovoltaic material are deposited onto the roof to form one or more layers of photovoltaic material as shown in FIGS. 3 and 4. Photovoltaic material 308 can be particles and/or nano-particles which can be used to form solar panel 108 or portions of solar panel 108. In FIG. 3, particles of photovoltaic material 308 are deposited onto the layer of paint 106 through a deposition device 322. The particles of photovoltaic material 308 form a first layer of photovoltaic material 324 on top of the layer of paint 106. Deposition device 322 can be, for example, an inkjet head, a nozzle, a paint nozzle, or any type of equipment appropriate to deposit particles and/or nano-particles. Deposition device 322 can advantageously allow a deposition of different shapes, lengths, thicknesses, and/or curvature of layers of photovoltaic materials to accommodate the desired shape, length, thickness, and/or curvature of roof 104. For example, if roof 104 had a bump in the middle, deposition device 322 would allow for an easy deposition of photovoltaic material over the bump whereas conventional solar panels might require that the solar panel be molded to accommodate the bump. Furthermore, more than one deposition device 322 can be used either serially or in parallel in time.

Although not shown, first layer of photovoltaic material 324 can be a thin sheet that is formed from particles of photovoltaic material 308 prior to deposition onto layer of paint 106. First layer of photovoltaic material 324 can then be deposited on top of the layer of paint 106. That is, instead of depositing the particles of photovoltaic material 308 onto the layer of paint 106 to form first layer of photovoltaic material 324, first layer of photovoltaic material 324 can be formed prior to deposition onto the layer of paint 106.

It is also contemplated that first layer of photovoltaic material 324 can be, one or more layers of photovoltaic material that solar panel 108 is formed from. For example, first layer of photovoltaic material 324 can be one or more layers of photovoltaic material of the dye solar panel depicted in FIG. 7 such as conducting substrate 730, electrolyte layer 732, dye layer 734, nano-porous titania (titanium dioxide) layer 736, and/or transparent conductor 738.

In FIG. 4, particles of photovoltaic material 308 are deposited on top of first layer of photovoltaic material 324 through deposition device 322 to form a second layer of photovoltaic material 426. Like first layer of photovoltaic material 324, second layer of photovoltaic material 426 can be one or more layers of photovoltaic material that solar panel 108 is formed from.

Referring back to FIG. 2, in step S206, the photovoltaic material such as first layer of photovoltaic material 324 and second layer of photovoltaic material 426 are cured. As seen in FIG. 5, first layer of photovoltaic material 324 and second layer of photovoltaic material 426 are cured using a curing device 528 which can transmit waves 530. Curing device 528 can be, for example, a heater, an infrared generator, an ultraviolet generator, an ultrasonic generator, a sound generator, a wind generator, an air conditioner, etc. Waves 530 can be, for example, heat waves, infrared waves, ultraviolet waves, ultrasonic waves, sound waves, etc. Although FIG. 5 depicts the use of curing device 528, it is also contemplated that photovoltaic material 308 can be cured without the aid of curing device 528. Afterwards, as shown in FIG. 6, first layer of photovoltaic material 324 and second layer of photovoltaic material 426 can form, for example, solar panel 108.

Although FIG. 6 depicts that solar panel 108 comprises only two layers of photovoltaic material, it is contemplated that solar panel 108 can comprise any number of layers of photovoltaic material. Also, although first layer of photovoltaic material 324 and second layer of photovoltaic material 426 have similar shapes, lengths, thickness, and curvatures, it is contemplated that first layer of photovoltaic material 324 and second layer of photovoltaic material 426 can have different shapes, lengths, thickness, and/or curvatures. In addition, since the shape, length, thickness, and curvature of first layers of photovoltaic material 324 and second layer of photovoltaic material 426 can vary, they can be deposited to reduce the drag of solar panel 108 and improve the aerodynamics of automobile 102.

Referring back to FIG. 2, in step S208, electrical leads 114 are formed on or attached to the photovoltaic materials which form solar panel 108. This can be done, for example, through adhesive, etching, deposition of conductive material, and/or welding of conductive material onto a portion of solar panel 108.

In step S210, roof 104 is attached to automobile 102. It is contemplated that forming solar panel 108 prior to attachment of roof 104 may be beneficial in allowing solar panel 108 to be formed in a relatively efficient manner reducing the time of production. Furthermore, forming solar panel 108 prior to the attachment of roof 104 may reduce the likelihood that photovoltaic material may be deposited in unwanted areas of automobile 102.

In step S212, electrical leads 114 are connected to energy storage unit 116 through antenna connection 112. As previously noted, electrical leads 114 can be connected to energy storage unit 116 through other connections on body 122 of automobile 102.

Should solar panel 108 be damaged, it is contemplated that damaged areas of solar panel 108 can be cleaned and solar panel 108 can be repaired by depositing new photovoltaic material through spraying and/or painting over the damaged areas. The cleaning process can include removing dislodged portions of solar panel 108 and/or placing a protective material over portions of solar panel 108 where new photovoltaic material does not need to be deposited.

This may be especially efficient in repairing solar panel 108 if solar panel 108 is formed from photovoltaic material that can be sprayed and/or painted onto the layer of paint 106, since any area where solar panel 108 has been damaged and photovoltaic material has been detached can now be repaired by simply depositing new photovoltaic material through spraying and/or painting. Furthermore, it is contemplated that this repair process can be done without discarding the original solar panel 108 or removing the original solar panel 108 from roof 104. Additionally, this repair process can be done with or without removing roof 104 from automobile 102.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. An automobile comprising: a body with an interior; a roof attached to the body; a layer of paint coated on top of the roof; an energy storage unit located within the interior of the body; and a layer of photovoltaic material deposited on top of the layer of paint to form a solar panel connected to the energy storage unit; an antenna located on the roof and connected to the interior of the body through an antenna connection; and an electrical lead connecting the solar panel to the energy storage unit, the electrical lead traversing the antenna connection.

2. The automobile of claim 1 wherein the solar panel is a thin film solar panel resistant to shattering.

3. The automobile of claim 2 wherein particles of photovoltaic material are sprayed onto the layer of the paint to form the layer of photovoltaic material.

4. The automobile of claim 3 wherein the layer of photovoltaic material is cured after the particles of photovoltaic material are sprayed onto the layer of paint to form the solar panel.

5. The automobile of claim 4 wherein the particles of photovoltaic material comprise a fullerene single wall nanotube complex.

6. The automobile of claim 4 wherein the particles of photovoltaic material comprise a plastic material including nanoparticles.

* * * * *